(12) United States Patent
Rai et al.

(10) Patent No.: US 7,755,778 B2
(45) Date of Patent: Jul. 13, 2010

(54) PRINT JOB MANAGEMENT SYSTEM

(75) Inventors: Sudhendu Rai, Fairport, NY (US); Zhenyu Zhang, Cambridge, MA (US)

(73) Assignee: Xerox Corporation, Norwalk, CT (US)

( * ) Notice: Subject to any disclaimer, the term of this patent is extended or adjusted under 35 U.S.C. 154(b) by 1026 days.

(21) Appl. No.: 11/393,064

(22) Filed: Mar. 30, 2006

(65) Prior Publication Data

US 2007/0236724 A1 Oct. 11, 2007

(51) Int. Cl.
*G03F 3/12* (2006.01)

(52) U.S. Cl. ...................... 358/1.1; 358/1.15; 358/1.16; 718/101; 718/102; 718/104; 718/105

(58) Field of Classification Search ....... 358/1.12–1.18; 709/246; 718/101, 102, 104, 105
See application file for complete search history.

(56) References Cited

U.S. PATENT DOCUMENTS

| | | | |
|---|---|---|---|
| 6,509,974 B1 * | 1/2003 | Hansen | 358/1.12 |
| 6,631,305 B2 | 10/2003 | Newmark | |
| 6,805,502 B2 | 10/2004 | Rai et al. | |
| 6,993,400 B2 | 1/2006 | Viassolo | |
| 7,382,484 B2 * | 6/2008 | Matsukubo et al. | 358/1.15 |
| 7,548,335 B2 * | 6/2009 | Lawrence et al. | 358/1.15 |
| 2002/0071134 A1 | 6/2002 | Jackson et al. | |
| 2002/0129081 A1 | 9/2002 | Rai et al. | |
| 2004/0239992 A1 * | 12/2004 | Kawai et al. | 358/1.15 |
| 2005/0065830 A1 | 3/2005 | Duke et al. | |
| 2006/0031585 A1 * | 2/2006 | Nielsen et al. | 709/246 |

* cited by examiner

*Primary Examiner*—Kimberly A Williams
(74) *Attorney, Agent, or Firm*—Pepper Hamilton LLP

(57) ABSTRACT

A system for managing the size of a print job to be processed in a print shop is provided. The print shop includes a plurality of autonomous cells and the job size management system includes a scheduling tool for generating a list including a plurality of jobs. A processor is used to (a) assign a job size related value to each one of the plurality of jobs so that the plurality of jobs are corresponded respectively with a set of job size related values, (b) use the set of job size related values to calculate a control limit, and (c) for each job size related value exceeding the control limit, splitting the job corresponding with the job size related value exceeding the control limit into n number of sub-jobs for processing at the plurality of autonomous cells.

19 Claims, 15 Drawing Sheets

FIG. 12

| Jobid | Arrival | Due | Available Hours | BWPrinting | Job Takt-Rate |
|---|---|---|---|---|---|
| 1212 | 3/14/05 2:07 PM | 3/18/05 2:07 PM | 64 | 52200 | 816 |
| 1261 | 3/15/05 5:50 PM | 3/16/05 12:00 PM | 10.16667 | 16625 | 1635 |
| 1272 | 3/16/05 1:08 PM | 3/21/05 4:31 PM | 51.38333 | 42180 | 821 |
| 1284 | 3/16/05 5:47 PM | 3/17/05 7:00 AM | 5.216667 | 5668 | 1087 |
| 1320 | 3/18/05 7:38 AM | 3/24/05 5:00 PM | 73.36667 | 71064 | 969 |
| 1359 | 3/22/05 9:17 AM | 4/29/05 5:00 PM | 455.7167 | 1143228 | 2509 |
| 1370 | 3/22/05 2:05 PM | 3/25/05 4:00 PM | 49.91667 | 57600 | 1154 |
| 1374 | 3/22/05 4:03 PM | 3/23/05 5:00 PM | 16.95 | 53500 | 3156 |
| 1420 | 3/23/05 4:34 PM | 3/24/05 12:00 PM | 11.43333 | 10430 | 912 |
| 1462 | 3/28/05 7:18 AM | 3/29/05 5:00 PM | 25.7 | 36800 | 1432 |
| 1478 | 3/28/05 12:36 PM | 4/4/05 4:00 PM | 83.4 | 60156 | 721 |
| 1479 | 3/28/05 12:37 PM | 4/4/05 4:00 PM | 83.38333 | 63828 | 765 |
| 1538 | 3/30/05 12:00 AM | 4/5/05 12:00 AM | 64 | 65000 | 1016 |
| 1573 | 4/4/05 9:50 AM | 4/8/05 12:00 PM | 66.16667 | 233100 | 3523 |
| 1664 | 4/7/05 7:28 AM | 4/8/05 7:00 AM | 15.53333 | 18500 | 1191 |
| 1671 | 4/7/05 9:55 AM | 4/7/05 4:00 PM | 6.083333 | 6215 | 1022 |

FIG. 13

| Jobid | Arrival | Due | Available Hours | BWPrinting | Job Takt-Rate | # of splits |
|---|---|---|---|---|---|---|
| 1212 | 3/14/05 2:07 PM | 3/18/05 2:07 PM | 64 | 52200 | 816 | 2 |
| 1261 | 3/15/05 5:50 PM | 3/16/05 12:00 PM | 10.16667 | 16625 | 1635 | 3 |
| 1272 | 3/16/05 1:08 PM | 3/21/05 4:31 PM | 51.38333 | 42180 | 821 | 2 |
| 1284 | 3/16/05 5:47 PM | 3/17/05 7:00 AM | 5.216667 | 5668 | 1087 | 2 |
| 1320 | 3/18/05 7:38 AM | 3/24/05 5:00 PM | 73.36667 | 71064 | 969 | 2 |
| 1359 | 3/22/05 9:17 AM | 4/29/05 5:00 PM | 455.7167 | 1143228 | 2509 | 21 |
| 1370 | 3/22/05 2:05 PM | 3/25/05 4:00 PM | 49.91667 | 57600 | 1154 | 2 |
| 1374 | 3/22/05 4:03 PM | 3/23/05 5:00 PM | 16.95 | 53500 | 3156 | 4 |
| 1420 | 3/23/05 4:34 PM | 3/24/05 12:00 PM | 11.43333 | 10430 | 912 | 2 |
| 1462 | 3/28/05 7:18 AM | 3/29/05 5:00 PM | 25.7 | 36800 | 1432 | 2 |
| 1478 | 3/28/05 12:36 PM | 4/4/05 4:00 PM | 83.4 | 60156 | 721 | 2 |
| 1479 | 3/28/05 12:37 PM | 4/4/05 4:00 PM | 83.38333 | 63828 | 765 | 2 |
| 1538 | 3/30/05 12:00 AM | 4/5/05 12:00 AM | 64 | 65000 | 1016 | 2 |
| 1573 | 4/4/05 9:50 AM | 4/8/05 12:00 PM | 66.16667 | 233100 | 3523 | 5 |
| 1664 | 4/7/05 7:28 AM | 4/8/05 7:00 AM | 15.53333 | 18500 | 1191 | 2 |
| 1671 | 4/7/05 9:55 AM | 4/7/05 4:00 PM | 6.083333 | 6215 | 1022 | 2 |

*FIG. 14*

| | A | B | C | D | E | N | O | P |
|---|---|---|---|---|---|---|---|---|
| 1 | Jobid | Arrival | Due | nbooks | BWPrinting | Punching | Binding | Padding |
| 69 | 1261 | 3/15/2005 17:50 | 3/16/2005 12:00 | 1 | 16626 | 8319 | 126 | 0 |

Original jobID 1261.

| | AD | AE | AF | AG | AH | AI | AQ | AR | AS |
|---|---|---|---|---|---|---|---|---|---|
| | Jobid | Arrival | Due | nbooks | BWPrinting | ColorPrinting | Punching | Binding | Padding |
| | 1261 | 3/15/05 5:50 PM | 3/16/05 12:00 PM | 0 | 0 | 5542 | 2773 | 42 | 0 |
| | 1261_1 | 3/15/05 5:50 PM | 3/16/05 12:00 PM | | 5542 | 0 | 2773 | 42 | 0 |
| | 1261_2 | 3/15/05 5:50 PM | 3/16/05 12:00 PM | | 5542 | 0 | 2773 | 42 | 0 |

*FIG. 15*

PRINT JOB MANAGEMENT SYSTEM

Cross-reference is made to co-pending, commonly assigned application, U.S. patent application Ser. No. 11/410,833 filed on Apr. 25, 2006, by Zhang et al., entitled Print Job Management System.

BACKGROUND AND SUMMARY

The disclosed embodiments relate generally to document management capability and, in one illustrative embodiment, to a system for managing the size of a print job in a print shop.

Conventional print shops typically are organized in a fashion so that related equipment is grouped together. For example, printing equipment may be grouped and located together, while finishing equipment may be grouped and located in another location. Thus, the print shop may be set up to have a printing department, a finishing department, and other departments corresponding to the type of process or operation that is performed within that department. The organization of a print shop is typically often independent of print job complexity, print job mix and total volume of print jobs.

When a new print job arrives, the print job sequentially passes through each department until the print job is completed. The conventional approach leads to significant time delays and increased work-in-progress and inventory costs.

Various improvements for print shop operation have been proposed, several of which have been published as:

U.S. Patent Publication 20020071134 to Jackson et al. Published on Jun. 13, 2002 Entitled, System and Method for Converting Print Jobs Stored in Print shop Job Description Language Files into Print shop Workflow U.S. Patent Publication 20020129081 to Rai et al. Published on Sep. 12, 2002 Entitled, Production Server Architecture and Methods for Automated Control of Production Document Management U.S. Patent Publication 20050065830 to Rai et al. Published on Mar. 24, 2005 Entitled, A System and Method for The Acquisition and Analysis of Data for Print Shop Performance Evaluation and Adjustment U.S. Pat. No. 6,805,502 to Rai et al. discloses an approach for dividing a print job into sub-jobs or "batches." The batches are separately processed so as to improve the total turnaround time that is required to complete the processing of the print job. The patent describes methods for selecting a batch size for batches so as to reduce the total turnaround time for the print job.

The pertinent portions of the above-cited publications are incorporated herein by reference.

It would be desirable, for the sake of achieving on-time percentage in a document production environment, to provide a technique that both simply and effectively addresses the problems associated with one or more relatively oversized jobs that, when released into a document production environment, cause lateness among related jobs. While the approaches disclosed by the above-mentioned references are well suited for their intended purpose, it would be desirable to provide a scheme that both identifies relatively oversized jobs and facilitates appropriate processing of the same to improve performance of the document production environment.

In accordance with one aspect of the disclosed embodiments, there is provided a system for managing the size of a job to be processed in a print shop. The print shop includes a plurality of autonomous cells with each autonomous cell including at least one device capable of processing at least a part of the job, and the job size management system includes: (a) a scheduling tool for generating a list including a plurality of jobs; (b) a processor operatively associated with the scheduling tool, the processor: (i) assigning a job size related value to each one of the plurality of jobs so that the plurality of jobs are corresponded respectively with a set of job size related values, (ii) using the set of job size related values to calculate a control limit, and (iii) for each job size related value exceeding the control limit, splitting the job corresponding with the job size related value exceeding the control limit into n number of sub-jobs for processing at the plurality of autonomous cells.

In accordance with another aspect of the disclosed embodiments, there is provided a system for managing the size of a job to be processed in a document management workflow. The job size management system includes a queue for listing a plurality of jobs and a processor operatively associated with the queue. In practice, the processor (i) assigns a value to each one of the plurality of jobs so that the plurality of jobs are corresponded respectively with a set of values, (ii) uses the set of values to calculate a threshold, and, (iii) for each value exceeding the threshold, splits the job corresponding with the value exceeding the threshold into n number of sub-jobs.

In accordance with yet another aspect of the disclosed embodiments, there is provided a method for managing job size. The method includes: providing a list including a plurality of jobs; assigning a value to each one of the plurality of jobs so that the plurality of jobs are corresponded respectively with a set of values; setting a threshold; and, for each value exceeding the threshold, splitting the job corresponding with the value exceeding the threshold into n number of sub-jobs.

BRIEF DESCRIPTION OF THE DRAWINGS

FIG. 12 is a planar view of a screen or dialog illustrating a document production scheduling tool;

FIG. 13 is a planar view of a screen or dialog showing a list of jobs from a simulation in which job-size>$UCL_{JS}$ or takt-rate>$UCL_{TR}$;

FIG. 14 is the displayed list of FIG. 13 showing the number of splits per jobs that are outside of a preset threshold or control limit;

FIG. 15 is a partial list from FIG. 14 displaying an incoming job split into three sub-jobs with the same arrival time and due date;

DESCRIPTION OF EMBODIMENTS

Figure 1:
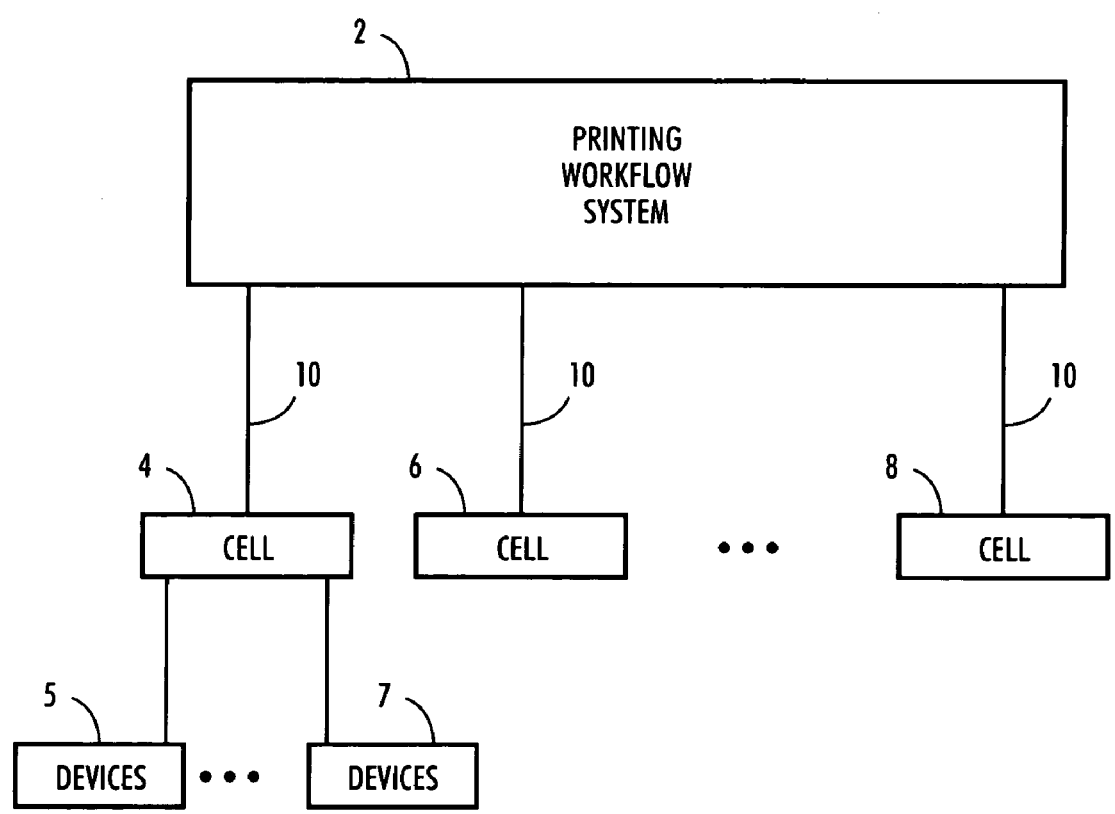
FIG. 1 is a diagrammatic illustration of a production workflow system (such as a document production workflow system) in combination with cells and their corresponding devices.

The disclosed embodiments contemplate the use of a lean production process server (LPPS) for coordinating production of document processing jobs in a document factory (such as a print shop). The server exploits lean production techniques to control document-processing jobs. The server can be run on a number of different platforms, including but not limited to UNIX, Windows or Window NT based-platform, such as a server computer system. The server determines workflow priorities and manages workflow accordingly. Those skilled in the art will appreciate that the disclosed embodiments may also be practiced with platforms that run other varieties of operating systems. Moreover, the server need not run on a dedicated computer system but rather may run on another variety of electronic devices, such as a printer, copier, etc. Workflow priorities for document processing jobs can be determined by observing the various jobs processing units.

The illustrative embodiments presume that the document factory has been partitioned into autonomous cells. Each cell is a logical grouping of resources (including both equipment and manpower) in the document factory that is sufficient for completing at least one type of document processing job. Thus, a first cell may include a printer and binder whereas a second cell may include a copier and a collator. The LPPS is responsible for distributing document processing jobs in such cells in an efficient manner (as will be described in more detail below).

Referring now in detail to the drawings, wherein the parts are designated by the reference numerals throughout, FIGS. 1-17 correspond with an illustrative embodiment of a document workflow system and a method for assigning sub-jobs to various cells in the document workflow system or according to the present invention. Although the disclosed embodiments are described with reference to exemplary embodiments illustrated in the drawings, it should be understood that the claimed invention could be embodied in many alternative forms.

FIG. 1 illustrates a printing workflow system 2 in a print shop (or, more generally, a document factory). The printing workflow system 2 controls a multitude of cells 4, 6, 8. The printing workflow system 2 sends information to and receives information from the cells 4, 6, 8 via the communication links 10. The cells 4, 6, 8 are comprised of at least one device 5 for assisting in completing a document processing job of given product-types. For example, printing device 5 can be a laser printer 600 dpi and printing device 7 can be a color printer 1200 dpi.

Figure 2:
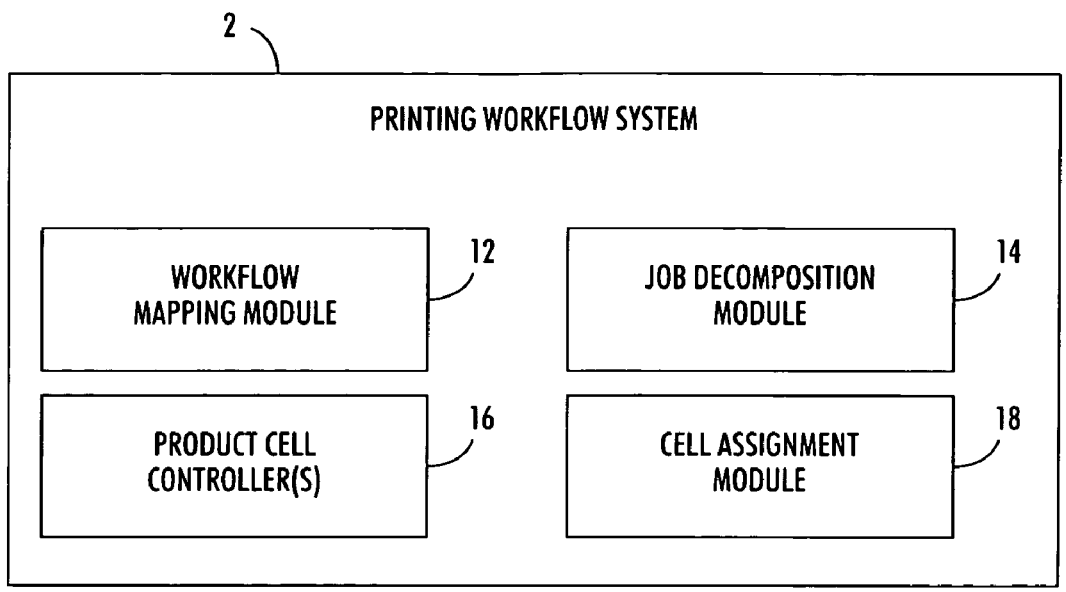
FIG. 2 is a diagrammatic illustration of software components employed in the production workflow system of FIG. 1.

FIG. 2 illustrates several of the software modules employed in the printing workflow system 2. The printing workflow system 2 includes a workflow-mapping module 12 that determines the workflow for selected document processing jobs. As will be described in more detail below, the workflow identifies the operational steps needed to complete a document-processing job. The workflow also identifies the sequence of these operational steps. A job decomposition module 14 is included for splitting the document processing jobs into sub-jobs and for sending the sub-jobs to cells for completion. A product cell controller (PCC) 16 may be provided at given cells for receiving at least one sub-job to further split the sub-job to be processed by a printing device in the cell. Lastly, a cell assignment module 18 is provided for assigning sub-jobs to be processed by a cell.

In general, a print job is received and a workflow for it is developed by the workflow mapping module 12. The job decomposition module may split the job into sub-jobs. The sub-jobs or job are then assigned to cells for completion by the cell assignment module 18. The sub-jobs may be sent to product cell controller 16 of the assigned cells, where each sub-job may be further sub divided.

Figure 3:
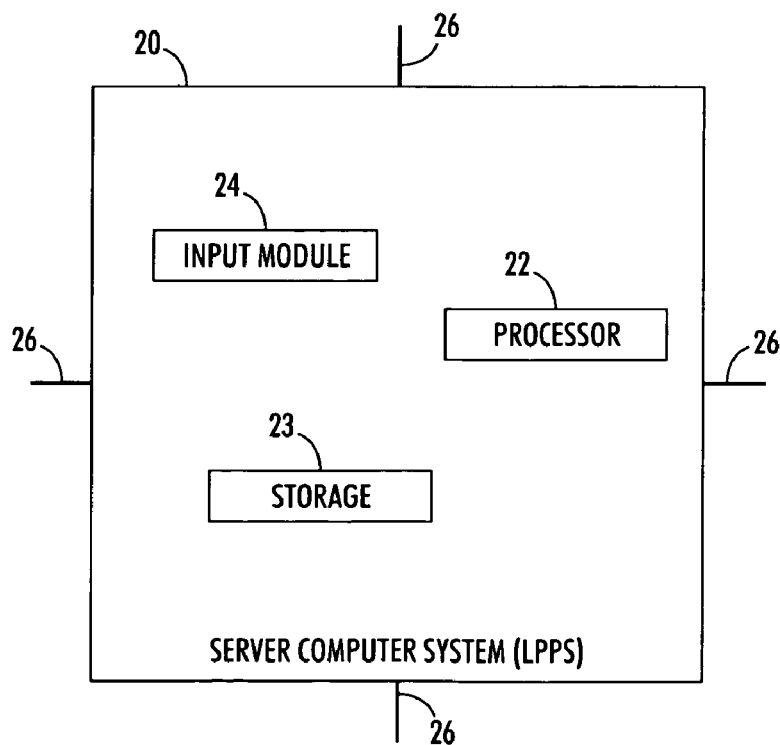
FIG. 3 is an illustration of a server employed in the production workflow system.

FIG. 3 illustrates a server computer system 20 (i.e., LPPS) which is suitable for use in the printing workflow system 2. The server 20 includes a processor 22, storage 23, communication links 26, and an input module 24. The input module 24 is used to receive input from various devices via the communications links 26. The input module 24 receives the document processing jobs on behalf of the server 20. The processor 22 executes the programming instructions on the server 20 to manage document processing jobs. The server 20 stores the instructions in the storage 23. For example, modules 12, 14, and 18 and other data are stored in storage 23. Module 16 may be executed on a separate server that is particular to a cell.

Figure 4:
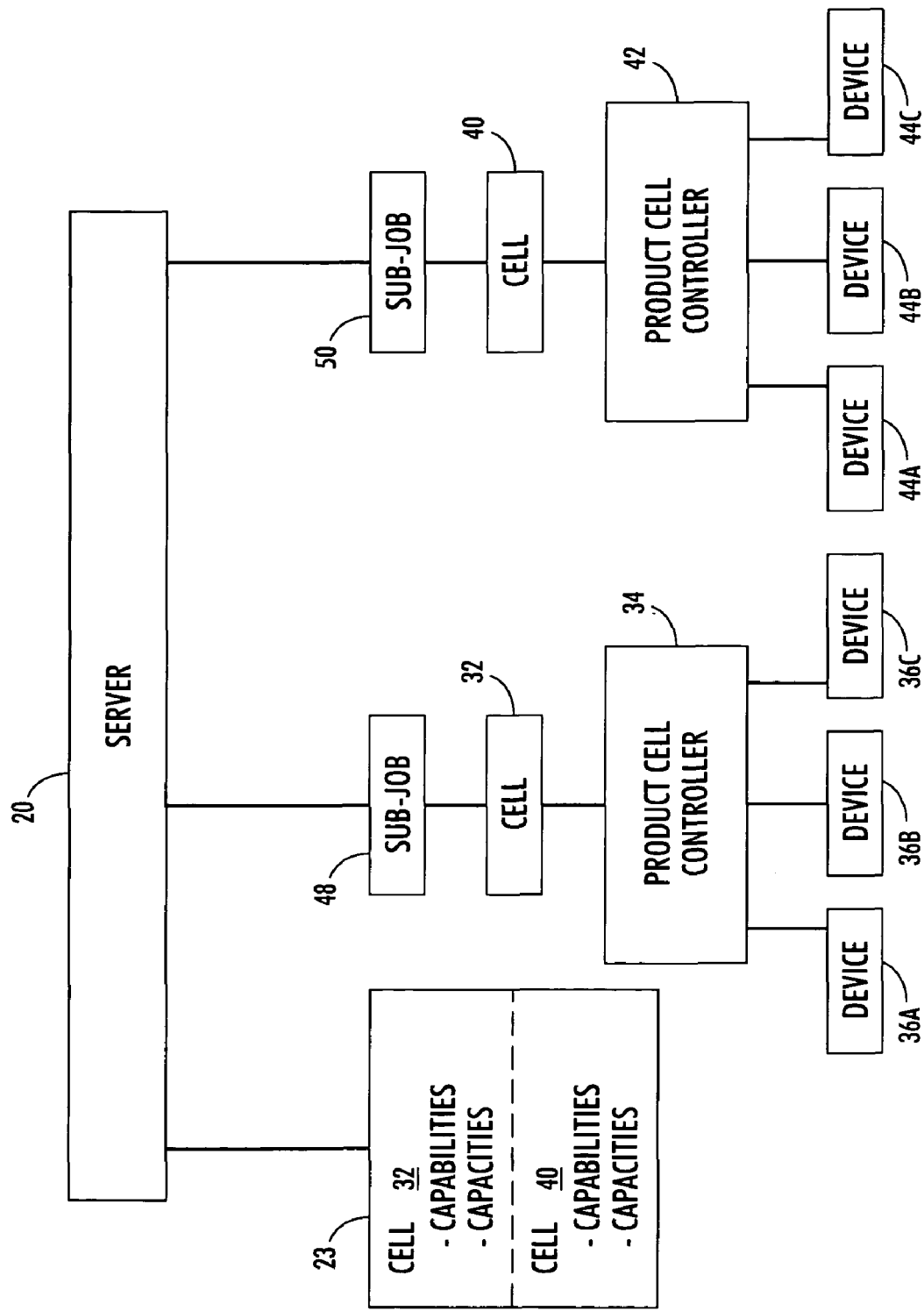
FIG. 4 illustrates the splitting of a document processing job into sub-jobs in one illustrative embodiment.

FIG. 4 illustrates the printing workflow system 2 interacting with a cell in a network provided in a print server. The product cell controller 34 for the cell receives a subjob 48 from the server 20 to be further processed by the cell. The server 20 stores in its storage 23 the capacities and capabilities of each cell in the print shop to produce different product-types. For example, cell 32 in the network produces three different types of documents and cell 40 produces two types of documents. (It is quite possible that two different cells can produce similar, or even the same, document types. A document type is uniquely characterized by the sequence of processing steps to completely finish the document). The server 20 stores this information to determine which cell has the capabilities to process a document job. The printing workflow system 23 also stores the capacity of each cell to determine the volume of a particular product-type that a cell can produce. As stated above, the job decomposition module 14 splits a document processing job into sub-jobs to be sent to various autonomous cells for processing. The cells in the network are autonomous and can produce their respective product entirely by themselves. Thus, in the example shown in FIG. 4, a document processing job is split into sub-jobs 48 and 50 that are sent to cells 32 and 40, respectively. The product cell controllers 34 and 42 send the sub-jobs 48 and 50 to devices 36a, 36b, 36c and 44a, 44b, 44c in the respective cells 32 and 40 for processing.

Figure 5:
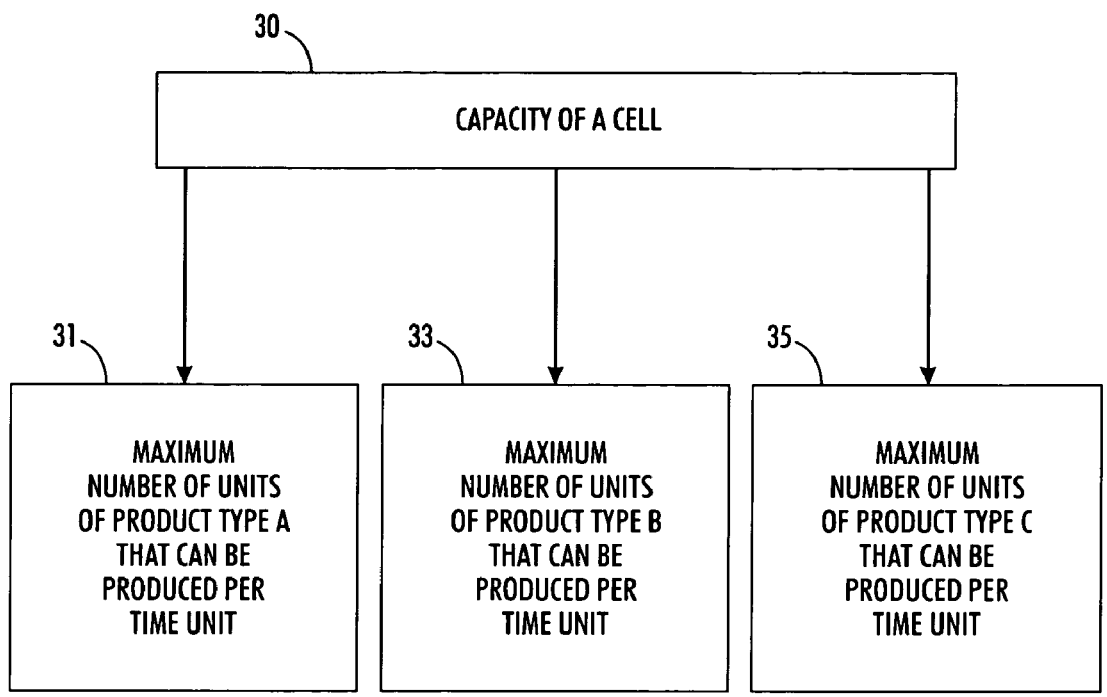
FIG. 5 is an illustration of a capacity of a cell.

FIG. 5 illustrates an example of how capacity is defined for a cell in the illustrative embodiment. As stated above, the printing workflow system 2 stores the capacity of each cell. "Capacity" is the maximum volume of a particular product type that the cell can produce for a time period. For example, FIG. 5 shows capacities for 31, 33, and 35 three different product types (Product A, Product B, and Product C). The printing workflow system 2 updates the capacities and makes it easier to determine which cells should be assigned a sub-job. Capabilities are used to determine the assignment for a cell to process a sub-job.

Figure 6:
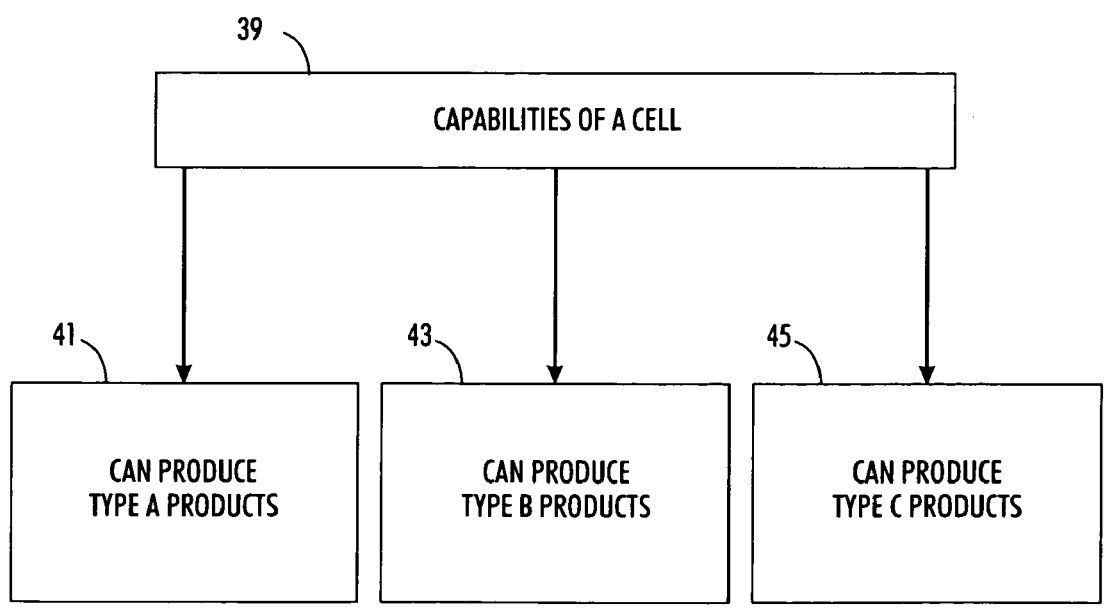
FIG. 6 is an illustration of capabilities of a cell.

Referring to FIGS. 4 and 6 an example regarding the capabilities 39 stored for a cell 32 is provided. Cell 32 is capable of processing various document product-types A, B, C. Hence, capabilities 41, 43, and 45 are stored for cell 32. For example, if a user has a document of product-type D, then cell 32 would not be the choice to accomplish the processing of the document because the cell 32 does not support such a capability. The printing workflow system 2, stores the capabilities for each cell in the print shop. This allows the cell assignment module 18 to examine the capacities and capabilities of the cells to determine which cell to assign a particular sub-job.

Figure 7:
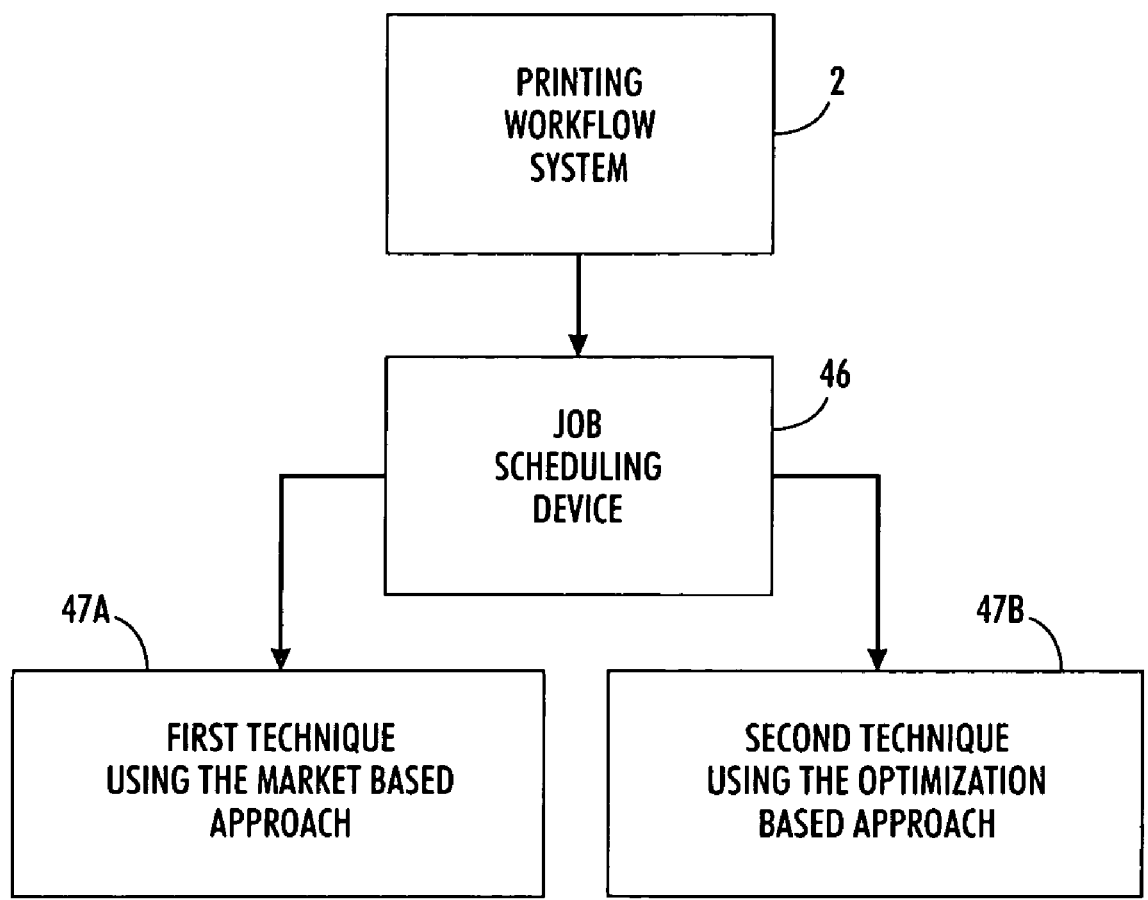
FIG. 7 is an illustration of a job scheduling device.

FIG. 7 illustrates a flow diagram of a job scheduling system described in U.S. patent application Ser. No. 11/254,501 to Lin et al. [U.S. Publication No. 20070092323]. Once a document processing job is prepared for processing, the job scheduling system 46 determines which one of several techniques for routing and scheduling document processing jobs should be used. A first technique 47a uses a market-based approach for scheduling a document processing job, while second technique 47b uses an optimization based approach for scheduling the document processing job. Detailed description of these first and second techniques is provided in U.S. patent application Ser. No. 11/254,501 to Lin et al. [U.S. Publication No. 20070092323], the pertinent portions of which are incorporated herein by reference. Further background regarding document processing job scheduling is provided in U.S. Pat. No. 6,805,502 to Rai et al., the pertinent portions of which are incorporated herein by reference.

Figure 8:
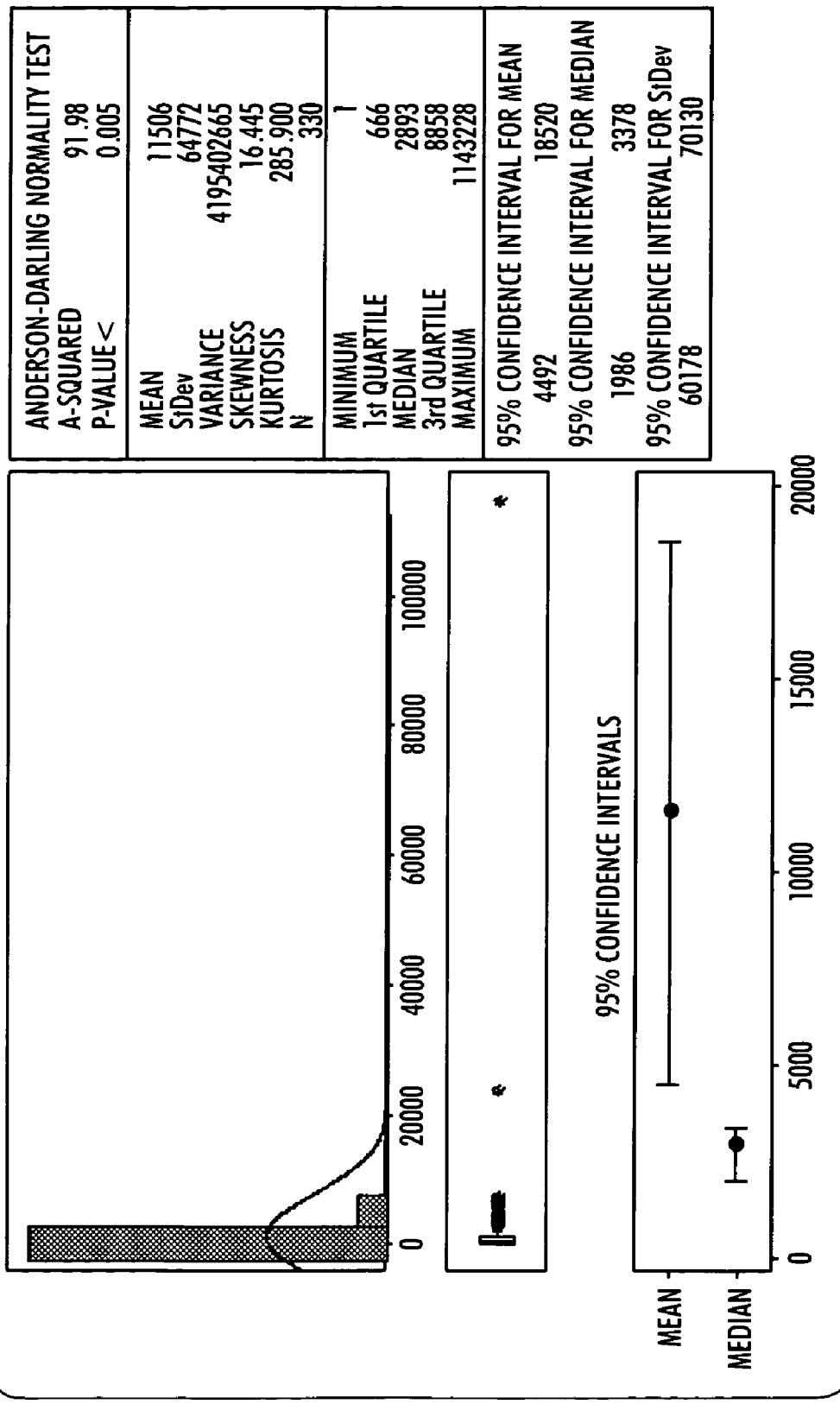
FIG. 8 is a statistical summary (including graphs) for the number of black-and-white pages per job.
Figure 9:
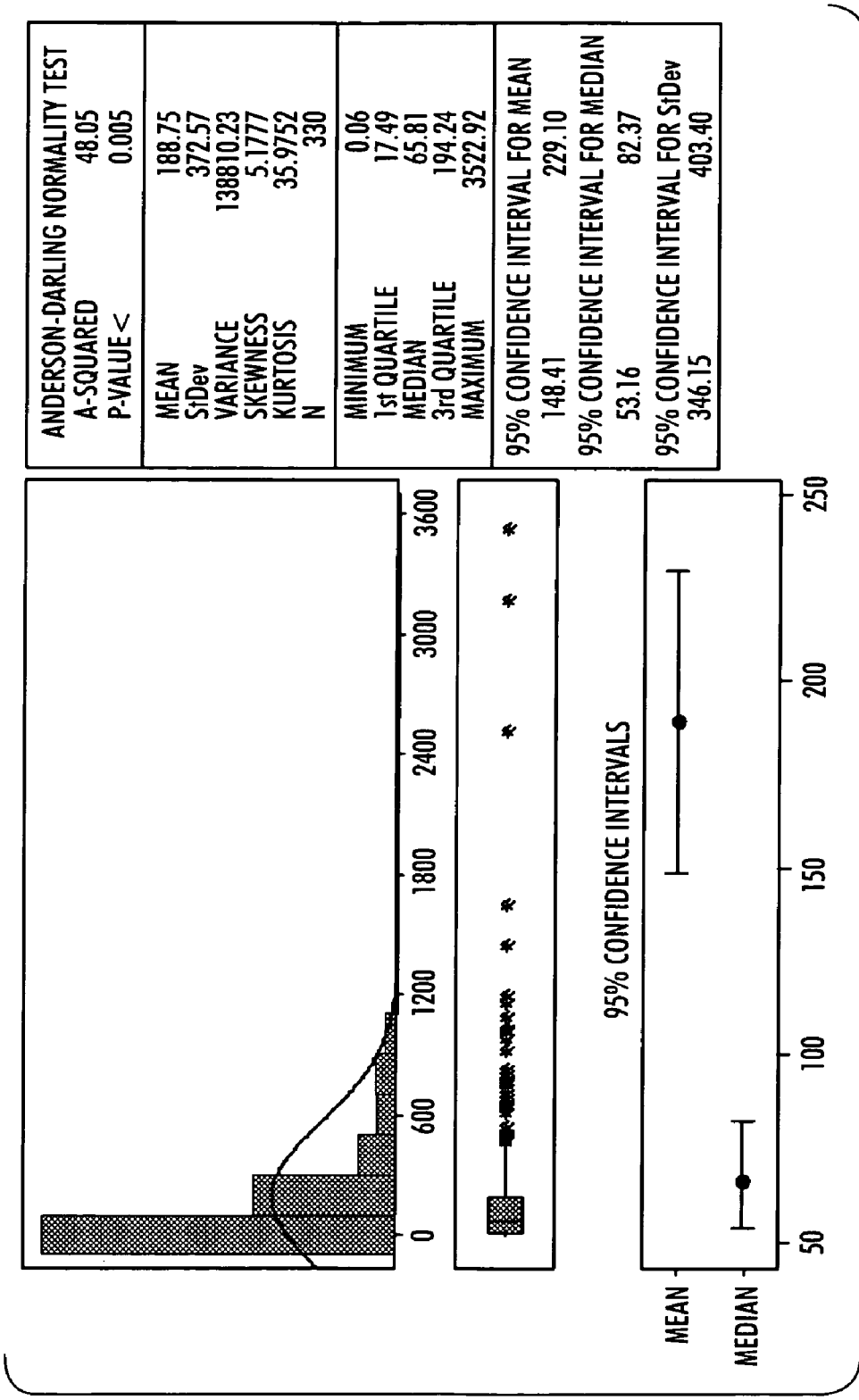
FIG. 9 is a summary distribution, expressed in terms of takt-rates, for the statistical summary of FIG. 8.
Figure 10A:
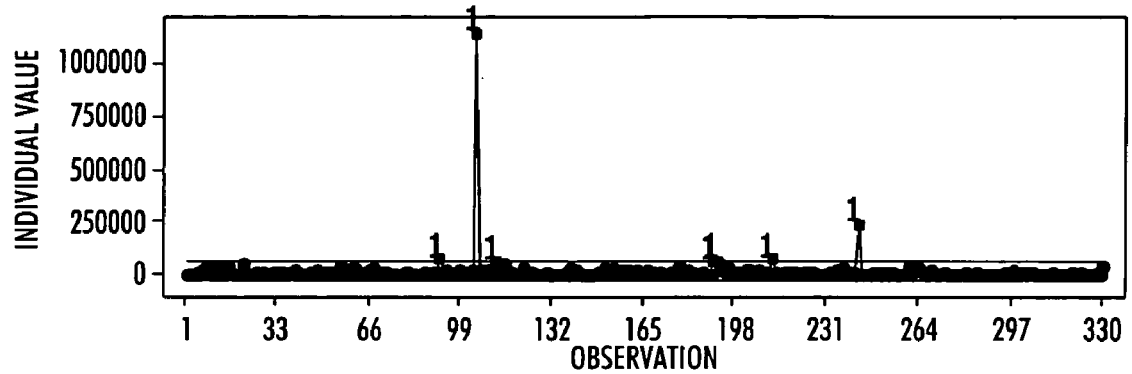
FIGS. 10A and 10B represent, in combination, an individual and moving-range (I-MR) chart based on the job size information of FIG. 8.
Figure 10B:
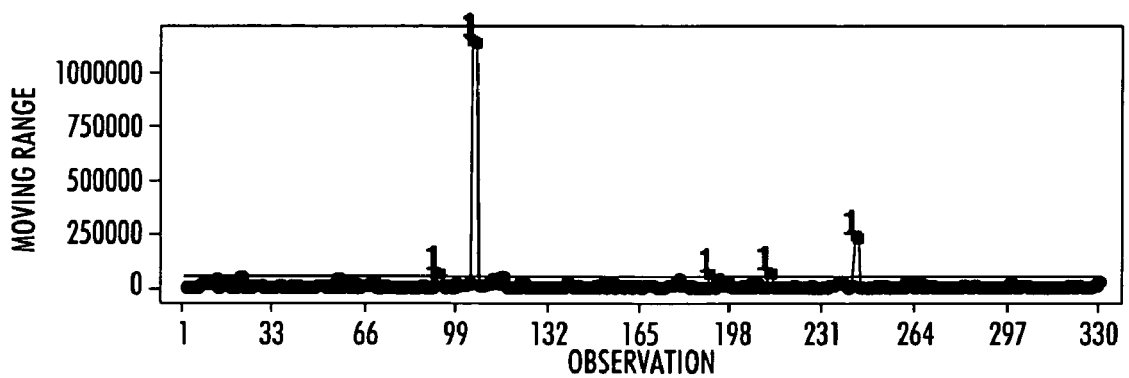
Figure 11A:
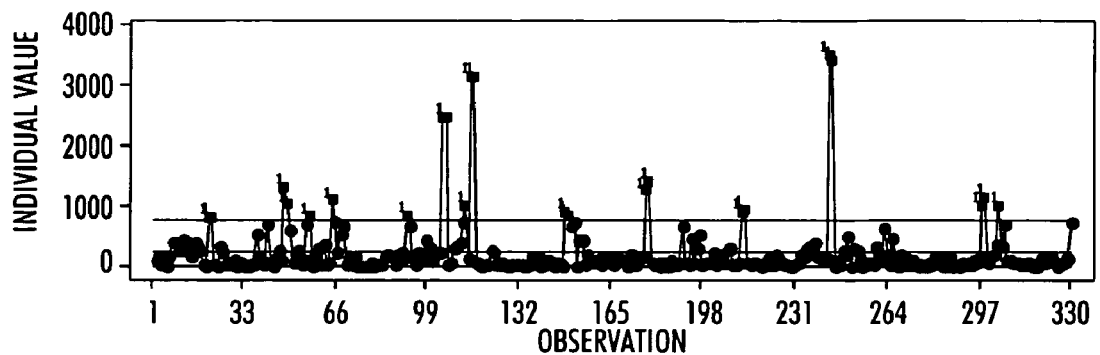
FIGS. 11A and 11B represent, in combination, an I-MR chart based on takt-rate information of FIG. 9.
Figure 11B:
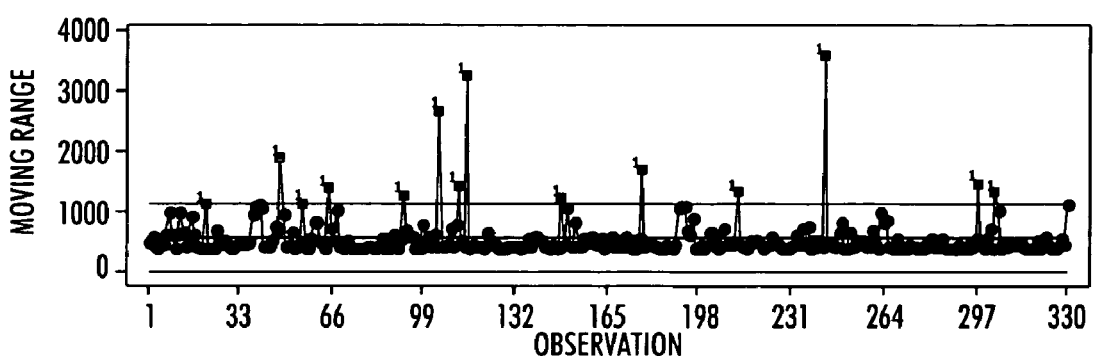

Referring now to FIGS. 8 and 9 a problem observed in a print shop environment is described. As is known, some print shops can experience a large fluctuation in job sizes and demand rates. As used herein, the term "job" is typically associated with a document and the information required in executing such document with a suitable platform in a document production environment; however, one of ordinary skill will readily appreciate that the term "job" can assume a wide range of meanings in a variety of factory-like production settings. For instance, in the area of pharmaceutical manufacturing, a job might contemplate the development of a batch of medical tablets. In that event, the job information might include, among other things, designations for amounts of materials to be used in manufacturing such tablets.

FIG. 8 illustrates an exemplary job size distribution (relative to number of black and white pages per job) for data collected from an exemplary print shop. It should be understood that the disclosed embodiments apply with equal force to a job printed in either a black and white or color setting. Referring to the information provided with FIG. 8, the mean job size is 11506 pages the minimum job size is 1 page and the maximum is 1143228 pages. As disclosed in U.S. Pat. No. 6,631,305 to Newmark, the pertinent portions of which are incorporated herein by reference, the job size distribution may be expressed in terms of "takt-time." As indicated in the '305 Patent, takt-time or "takt-rate is the rate in time that a factory must meet to meet customer demand, and is a useful parameter in analyzing the performance of an assembly line. In terms of document production, Takt-Rate may be expressed as, $$\text{Takt-Rate}_{Job} = \text{Job Size/Available Production Hours}$$

FIG. 9 illustrates the takt-rate distribution corresponding with the job size distribution of FIG. 8. Referring to the information of FIG. 9, the minimum takt-rate is 0.06 and the maximum takt-rate is 3523.

Referring to FIGS. 10A, 10B, 11A and 11B, individual and moving-range (I-MR) plots derived from FIGS. 8 and 9 are shown. It should be noted that each one of the plots corresponds with a distribution for 490 jobs, and includes a mean as well as an upper control limit (UCL). As is known, the UCL represents three standard deviations from the mean. As will appear, the UCL can be used advantageously to determine how a job should be split in accordance with the disclosed embodiments.

Figure 12:
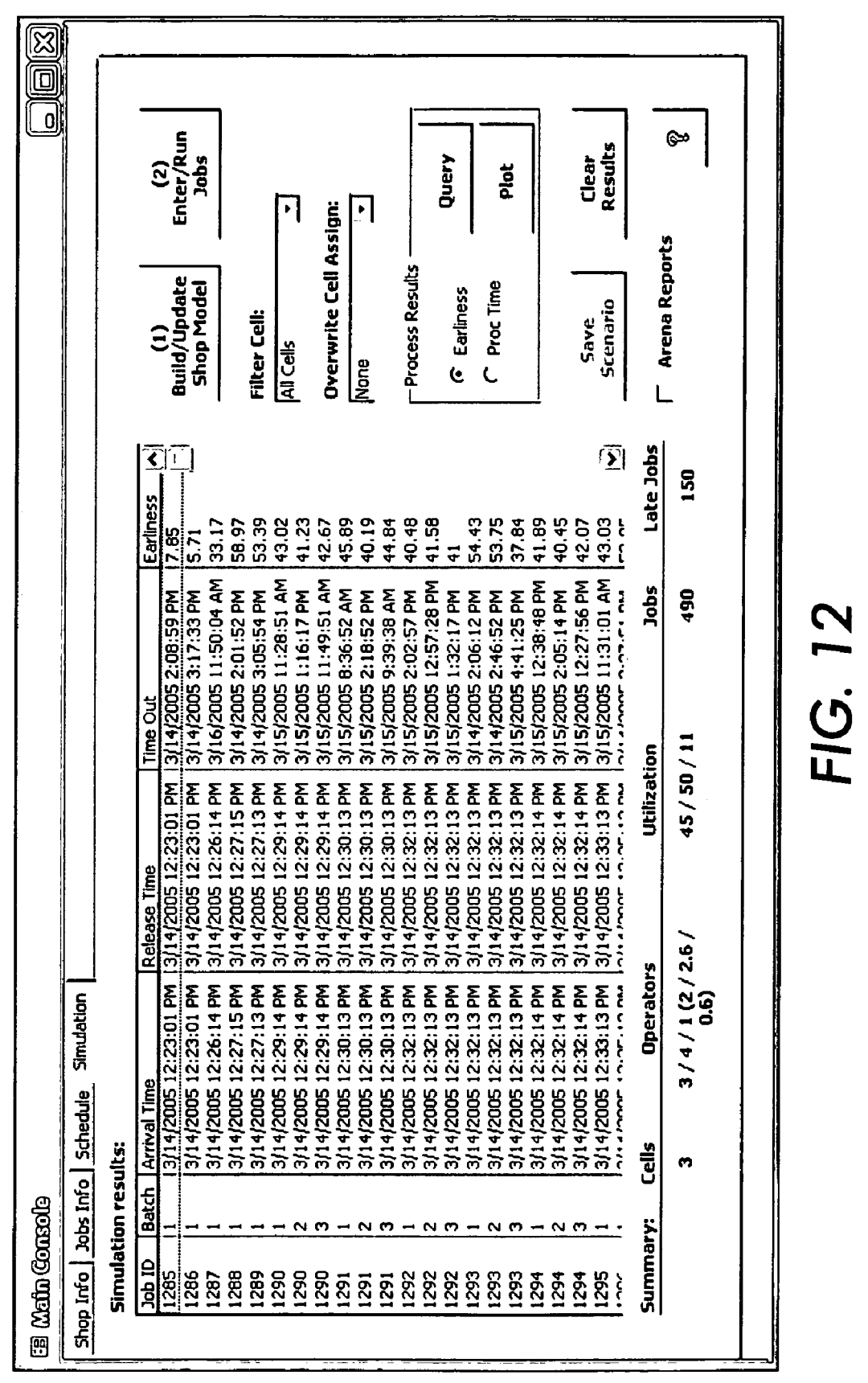

A simulation for an exemplary print shop or like factory, using suitable document production tools of the type disclosed in U.S. Pat. No. 6,993,400 to Viassolo, the pertinent portions of which are incorporated herein by reference, was performed across three cells with the 490 jobs. FIG. 12 comprises a dialog corresponding with a document production scheduling tool suitable for use in displaying the results of the simulation. It should be noted that the production scheduling tool operates as a job queue display, and provides, among other things, information regarding "Earliness (the reverse of "lateness")," "Utilization (the ratio of used capacity to available capacity)," and "Late Jobs."

The performance of the simulation yielded the following results:

| | |
|---|---|
| Lateness: | 150/490 |
| On-time percentage: | 69.39% ((490 − 150)/490) |
| Mean lateness: | 61 h |
| Mean job processing time: | 37 h |

One of the reasons for this performance may be that when a large job is released to a document production framework for processing within a cell, even though the job is split into batches in the cell, the batches are all processed in sequence with no pre-emption. In this sort of processing scenario, all jobs behind the large job would end up being late. Another reason could be that in one approach to document production scheduling each job is assigned to a single cell. For large jobs this would overload a single cell, notwithstanding the availability of capacity in other cells. To improve the performance of large jobs in the above-described scenario, the following pre-processing or "smoothing" of a job input stream has been found to be effective [it should be noted that the following preprocessing steps need not necessarily be performed in the order described below]:

First, referring to FIGS. 10A, 10B, 11A and 11B, the UCLs for job size ($UCL_{JS}$) and takt-rate ($UCL_{TR}$) are determined. In the examples of FIGS. 10A, 10B, 11A and 11B, $UCL_{JS}$=56636 and $UCL_{TR}$=802. Second, all jobs having either a job size greater than $UCL_{TR}$, or a takt-rate greater than $UCL_{TR}$ are noted. Referring to FIG. 13, a list of jobs meeting this UCL-based criterion is shown.

Third, each job is split into sub-jobs with the same arrival and due date as the original jobs in a manner such that each sub-job has a takt-rate <$UCL_{TR}$ or jobsize <$UCL_{TR}$. For each job, the number of subjobs perjob can be determined by the following formula:

No. of splits=Roundup (Max(JobSize/$UCL_{JS}$, TaktRate/$UCL_{TR}$)), where, the Roundup function round fractions up to the highest integer Referring to FIG. 14, the results of applying this formula to the list of FIG. 13 is shown.

Finally, page quantities of all jobs may be split in proportion to the number of splits determined with the above-indicated formula. Thus the quantity with each operation is divided by the number of sub-jobs to obtain the quantities to be processed for each sub-job. Referring to FIG. 15, a job (e.g. JobID 1261) is shown as being split into three sub-jobs with the same arrival time. In one example of operation, the three sub-jobs are distributed respectively across the three cells of the exemplary print shop or factory. Results of smoothing the above-mentioned job input stream is illustrated by way of the following table:

TABLE 1

Results of exemplary print shop simulation - with and without smoothing

|  | Without Smoothing | With Smoothing |
|---|---|---|
| Lateness (Late Jobs/Total Jobs) | 150/490 | 22/490 |
| On-Time Percentage (%) | 69.39 | 95.5 |
| Mean Earliness (h) | 61.0 | 14.4 |
| Mean Processing Time (h) | 37.0 | 5.9 |

To assess the effectiveness of the above-disclosed smoothing approach, a variability analysis of job size disturbance was performed. In the variability analysis, the relationship between job variability and on-time percentage (OT %) is examined. Variability of job size is quantified by the coefficient of variation (CV), where CV is defined as the ratio of the Standard Deviation to the Mean.

Figure 16:
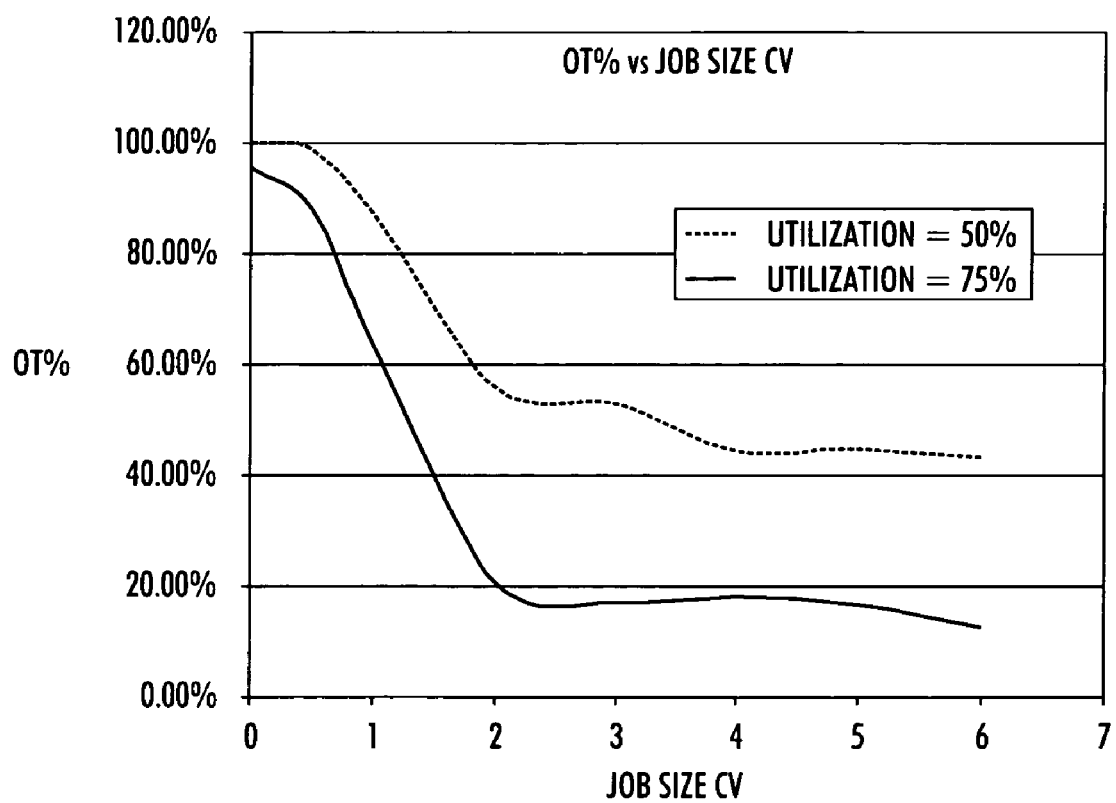
FIG. 16 is a graph illustrating a relationship between job size variability and on-time percentage.

Referring to FIG. 16, the impact of job size CV to OT % is considered. For the example of FIG. 16, assume two utilization levels (50% and 75%) and that job size CV is varied from 0.0 to 6.0. The plot of FIG. 16 illustrates, among other things:

For the utilization level at 50%, when job size CV interval is 0.0 to 0.8, OT % decreases nominally;

For the utilization level at 50%, as job size CV increases beyond 0.8, OT % decreases sharply;

As job size CV increases, the sharp decrease occurs earlier for the 75% utilization level than for the 50% utilization level; and As job size CV increases, OT % decreases more sharply for 75% utilization than for 50% utilization.

Based on the above disclosure, it follows that large CV of job size distribution is usually caused by the disturbance of jobs having relatively large size, such as spike demand in FIGS. 10A, 10B, 11A or 11B. By smoothing these relatively large jobs, as described above, job size CV can be internally reduced and OT % effectively improved.

Figure 17:
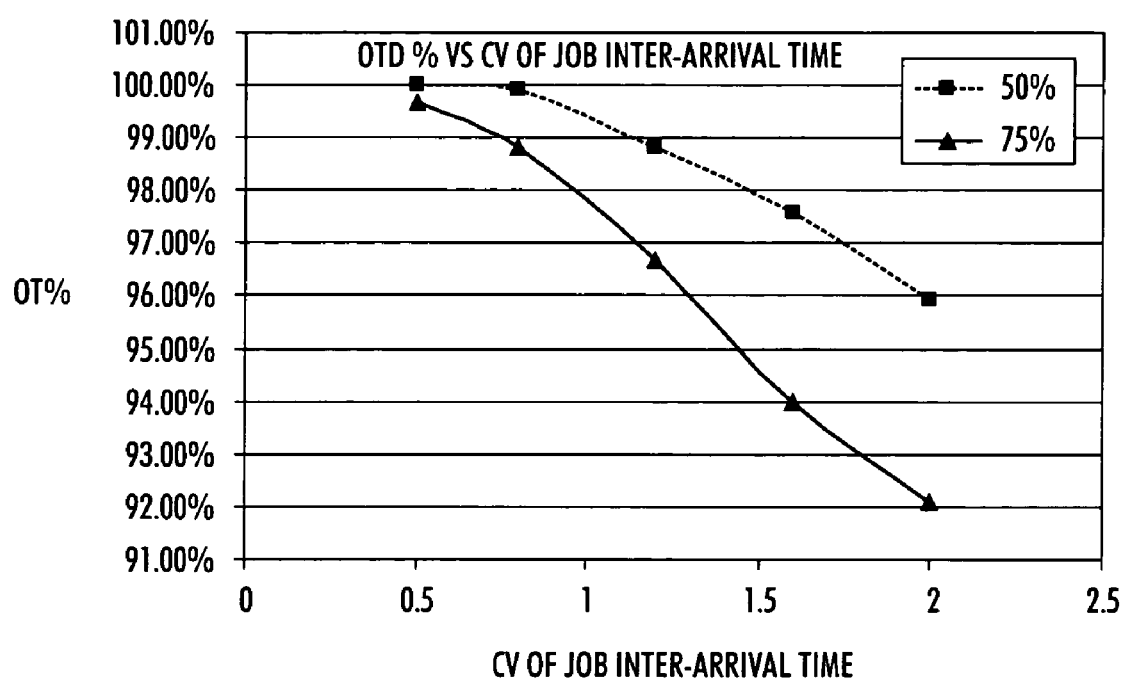
FIG. 17 is a graph illustrating a relationship between job inter-arrival time variability and on-time percentage.

Referring finally to FIG. 17, it can be observed that, while the disclosed smoothing technique will affect the distribution of job inter-arrival time and thus increase the CV of job inter-arrival time distribution, the reduction on OT % due to the increase of job inter-arrival CV is relatively small, less than about 0.5% decrease per 0.1 CV of job inter-arrival time increase when the utilization level is 50%.

As illustrated in the following Table 2, the smoothing heuristics described above can significantly improve, among other things, the statistical parameters associated with job size distribution. It follows that takt-rate distribution could also be significantly improved.

TABLE 2

Comparison of statistical parameters - with and without smoothing

| Job Size | Without Smoothing | With Smoothing |
|---|---|---|
| Mean (Pages) | 11506 | 10209 |
| Standard Deviation | 64772 | 14642 |
| CV | 5.6 | 1.4 |

As expected, when CV of job size is reduced from 5.6 to 1.4, the improvement in OT % is significant: from less than 70% to greater than 90%. In view of the above analysis, it will be appreciated by those skilled in the art that control limits or thresholds can be set in such a way that job splitting is optimized and job size CV can be kept below a pre-selected level or threshold.

The disclosed embodiments relate to a heuristic for smoothing job input for more efficient scheduling and productivity improvement in a cellular hierarchical document production environment. The disclosed smoothing technique can be used to determine when job size (possibly represented by a job sized related value) varies significantly from a first preset threshold. The smoothing technique can also be used to determine when takt-rate varies significantly from a second preset threshold. The technique can advantageously be applied to the scheduling tool on job input streams before processing them by the hierarchical scheduling algorithm. Additionally, a job may be split precisely with a formula accommodating for one of several values, such as a job size or takt-rate related value. Even though exemplary simulation used the black & white printing job-size for demonstrating the technique, the technique can be easily applied to other parameters such as color job-size or some other production operation of interest. For another production operation of interest, the number of job-splits will be the maximum of the job split predicted by each individual operation. Finally, on-time % for the job processing can be improved considerably, notwithstanding an increase in an associated coefficient of variability of job inter-arrival time distribution.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A system for managing the size of a print job, the system comprising:

a scheduling tool for generating a workflow comprising a plurality of print jobs, wherein each print job is associated with a sequence of processing steps required to process the print job, and wherein the scheduling tool is configured to:

assign a job size value to each one of the plurality of print jobs, determine a control limit based on the job size values, for each job size value exceeding the control limit, split the print job corresponding to the job size value into n number of sub-jobs, and assign each sub-job to one of a plurality of autonomous cells based on at least one or more capacities associated with the autonomous cell and the sequence of processing steps associated with the print job, wherein at least one device associated with the autonomous cell is configured to perform one or more processing steps in the associated sequence of processing steps on the assigned sub-job.

2. The job size management system of claim 1, wherein said job splitting is performed with a formula, the formula varying, at least in part, as a function of one or more job size related values exceeding the control limit.

3. The job size management system of claim 2, wherein said scheduling tool uses the formula to round the value of n to an integer.

4. A system for managing the size of a job to be processed in a document management workflow, the system comprising:

a queue comprising a plurality of jobs, wherein each job is associated with a sequence of processing steps required to process the job;

a processor operatively associated with said queue; and a processor-readable storage medium in communication with the processor, wherein the processor-readable storage medium comprises one or more programming instructions for:
assigning a value to each one of the plurality of jobs so that the plurality of jobs are corresponded respectively with a set of values,
using the set of values to calculate a threshold,
for each value exceeding the threshold, splitting the job corresponding with the value exceeding the threshold into n number of sub-jobs, and
assigning each sub-job to one of a plurality of autonomous cells based on at least one or more capacities associated with the autonomous cell and the sequence of processing steps associated with the print job, wherein at least one device associated with the autonomous cell is configured to perform one or more processing steps in the associated sequence of processing steps on the assigned sub-job.

5. The job size management system of claim 4, in which the document management workflow comprises a print shop and the print shop includes the plurality of autonomous cells with each autonomous cell including at least one device capable of processing at least a part of the job, wherein the n number of sub-jobs are processed at the plurality of autonomous cells.

6. The job size management system of 4, in which each value comprises a job size related value, wherein said splitting is performed with a formula, the formula varying, at least in part, as a function of one or more job size related values exceeding the threshold.

7. The job size management system of 6, wherein the formula further varies as a function of job processing time.

8. The job size management system of claim 4, wherein the threshold comprises a statistical metric.

9. A method for managing print job size, comprising:
providing a list comprising a plurality of print jobs, wherein each print job is associated with a sequence of processing steps required to process the print job;
assigning, by a computing device, a value to each one of the plurality of print jobs so that the plurality of print jobs are corresponded respectively with a set of values;
setting a threshold;
for each print job associated with a value exceeding the threshold, splitting the print job into n number of sub-jobs; and
assigning each sub-job to one of a plurality of autonomous cells based on at least one or more capacities associated with the autonomous cell and the sequence of processing steps associated with the print job, wherein the autonomous cell comprises at least one device configured to perform one or more processing steps in the associated sequence of processing steps on the assigned sub-job.

10. The method of claim 9, wherein said splitting comprises splitting the print job into a plurality of sub-jobs of equal size.

11. The method of claim 9, wherein each print job has a size value, wherein said assigning comprises using the job size values to obtain the set of values.

12. The method of claim 11, in which the threshold comprises a statistical metric, wherein said setting includes using the set of values to obtain the statistical metric.

13. The method of claim 12, wherein said splitting includes using a formula to perform said splitting and said formula varies, at least in part, as a function of one or more values exceeding the threshold.

14. The method of claim 13, wherein said using the formula includes rounding the value of n to an integer.

15. The method of claim 9, in which each job is associated with a number of hours available to execute the print job and a size value, wherein said assigning includes using the job size values and the numbers of hours to obtain the set of values.

16. The method of claim 15, in which the threshold comprises a statistical metric, wherein said setting includes using the set of values to set the statistical metric.

17. The method of claim 9, wherein assigning comprises:
assigning each sub-job to one of a plurality of autonomous cells in a print shop, wherein the print shop comprises at least n autonomous cells with each autonomous cell comprising at least one device capable of performing one or more processing steps in the associated sequence of processing steps on the assigned sub-job; and
scheduling the n sub-jobs in such a manner that the n sub-jobs are communicated respectively to the n autonomous cells.

18. The method of claim 9, in which variability of job size is quantified by a coefficient of variation (CV), wherein said setting and splitting are performed in such a way that the CV is less than a pre-selected threshold.

19. The method of claim 9, wherein the splitting comprises determining a number of splits for each print job by:
determining a job size upper control limit and a takt-rate upper control limit associated with the print job;
determining a first ratio of a job size of the print job to the job size upper control limit;
determining a second ratio of a takt-rate associated with the print job to the takt-rate upper control limit;
in response to a value of the first ratio exceeding a value of the second ratio, identifying the value of the first ratio as a split number;
in response to the value of the second ratio exceeding the value of the first ratio, identifying the value of the second ratio as the split number;
determining a sub-job number by rounding the split number up to a next whole integer; and
splitting the print job into a number of sub-jobs equal to the sub-job number,
wherein each sub-job has an arrival time and a due date equal to that of the print job,
wherein each sub-job is associated with a takt-rate that is less than the takt-rate upper control limit and a job size that is less than the job size upper control limit.

* * * * *